United States Patent
Nunez et al.

(10) Patent No.: US 10,228,047 B2
(45) Date of Patent: Mar. 12, 2019

(54) ACTUATOR FOR PROVIDING RELATIVE MOTION BETWEEN TWO POINTS

(71) Applicants: Robert Bosch LLC, Broadview, IL (US); Robert Bosch GmbH, Stuttgart (DE)

(72) Inventors: Ivan Colin Nunez, Metepec (MX); Allan Dassaev Cadena Lopez, Toluca (MX)

(73) Assignees: Robert Bosch LLC, Broadview, IL (US); Robert Bosch GmbH, Stuttgart (DE)

( * ) Notice: Subject to any disclaimer, the term of this patent is extended or adjusted under 35 U.S.C. 154(b) by 448 days.

(21) Appl. No.: 15/185,348

(22) Filed: Jun. 17, 2016

(65) Prior Publication Data

US 2017/0363189 A1 Dec. 21, 2017

(51) Int. Cl.
  *F16H 25/20* (2006.01)
  *F16H 25/24* (2006.01)

(52) U.S. Cl.
  CPC ......... *F16H 25/2472* (2013.01); *F16H 25/20* (2013.01); *F16H 25/2006* (2013.01); *F16H 25/2021* (2013.01); *F16H 2025/209* (2013.01); *F16H 2025/2031* (2013.01); *F16H 2025/2059* (2013.01); *F16H 2025/2084* (2013.01)

(58) Field of Classification Search
  CPC ... F16H 25/2472; F16H 25/20; F16H 25/2006
  See application file for complete search history.

(56) References Cited

U.S. PATENT DOCUMENTS

| 2,769,351 | A | | 11/1956 | Serfling et al. |
| 3,343,427 | A | | 9/1967 | Silvestri |
| 3,559,499 | A | | 2/1971 | Profet |
| 4,179,944 | A | * | 12/1979 | Conner .................. B64C 13/42 |
| | | | | 192/141 |

(Continued)

FOREIGN PATENT DOCUMENTS

| EP | 0480159 | 12/1994 |
| EP | 1980470 | 10/2008 |
| JP | 2002087287 | 3/2002 |

OTHER PUBLICATIONS

European Partial Search Report—European Application Serial No. 17170365.5.

(Continued)

*Primary Examiner* — David M Fenstermacher
(74) *Attorney, Agent, or Firm* — Kelly McGlashen; Maginot Moore & Beck LLP (57) ABSTRACT

An actuator is suitable for providing linear motion between two points, and may be used, for example, in motorized positioning of an automobile steering column. The actuator includes a threaded spindle connected to a drive motor via a gear set, a first connection interface mounted on the spindle and engaged with the spindle thread, and a second connection interface mounted on the spindle and engaged with the spindle thread. The second connection interface is moveable along the spindle axis relative to the first connection interface when the spindle is driven by the drive motor. The actuator is arranged such that the first and second connection interfaces are disposed on the same side of the gear set.

19 Claims, 9 Drawing Sheets

(56) References Cited

U.S. PATENT DOCUMENTS

| | | | |
|---|---|---|---|
| 4,716,780 A | 1/1988 | Nishikawa et al. | |
| 4,727,762 A | 3/1988 | Hayashi | |
| 4,745,815 A * | 5/1988 | Klopfenstein | B64C 13/38 244/228 |
| 5,035,446 A * | 7/1991 | Arvidsson | B62D 1/181 280/775 |
| 5,086,900 A * | 2/1992 | Kikuta | E05B 81/25 192/141 |
| 5,178,411 A * | 1/1993 | Fevre | B62D 1/181 280/775 |
| 5,620,078 A * | 4/1997 | Nakamura | F16H 25/2015 192/142 R |
| 5,910,692 A * | 6/1999 | Saeda | F16H 25/20 310/13 |
| 6,079,743 A | 6/2000 | Grams | |
| 6,390,505 B1 * | 5/2002 | Wilson | B62D 1/181 280/775 |
| 7,025,380 B2 * | 4/2006 | Arihara | B62D 1/181 280/775 |
| 7,055,860 B2 | 6/2006 | Armstrong et al. | |
| 7,159,904 B2 * | 1/2007 | Schafer | B62D 1/181 280/775 |
| 8,056,437 B2 * | 11/2011 | Rouleau | B62D 1/187 74/493 |
| 8,151,668 B2 * | 4/2012 | Oshita | B62D 1/181 280/774 |
| 8,448,986 B2 * | 5/2013 | Fevre | B62D 1/181 280/775 |
| 8,979,126 B2 * | 3/2015 | Morinaga | B62D 1/181 280/775 |
| 9,260,130 B2 * | 2/2016 | Mizuno | B62D 1/187 |
| 9,610,968 B2 * | 4/2017 | Born | B62D 1/181 |
| 9,676,298 B2 * | 6/2017 | Beneker | B60N 2/0232 |
| 2004/0032121 A1 * | 2/2004 | Schafer | B62D 1/181 280/775 |
| 2014/0326089 A1 | 11/2014 | Wu | |
| 2015/0375769 A1 | 12/2015 | Abboud et al. | |

OTHER PUBLICATIONS

GM Steering Column Assembly—GM22834567 = part No. 13 on image (motor telescope); Steering column assembly 2015 Chevrolet Suburban LTZ.

* cited by examiner

ACTUATOR FOR PROVIDING RELATIVE MOTION BETWEEN TWO POINTS

BACKGROUND

Field of the Invention

The present invention relates to an actuator that provides relative linear motion between two points. In particular, the actuator includes a threaded spindle, and first and second connection interfaces mounted on the spindle such that the second connection interface is moveable along the spindle axis relative to the first connection interface when the spindle is driven by a drive motor.

Description of the Related Art

Actuators are frequently used to adjust the position of vehicle components to accommodate driver requirements. In one example, a seat positioning actuator includes a drive motor and a spindle assembly that are used to adjust vehicle seat position, including fore-aft seat position. In another example, a steering column positioning actuator includes a drive motor and a spindle assembly that are used to adjust the fore-aft position of a vehicle steering wheel within the passenger compartment of the vehicle. Regardless of actuator application, a need exists to reduce actuator size and axial play of the spindle assembly, and to simplify the design in order to reduce manufacturing costs.

SUMMARY

In some aspects, an actuator includes a spindle having a first end and an opposed second end, and the spindle includes an external thread disposed between the first end and the second end. The actuator includes a transmission element disposed on the first end and having radially extending gear teeth, and the gear teeth are configured to engage a drive gear that drives the spindle to rotate about a spindle axis. In addition, the actuator includes a first connection interface mounted on the spindle and engaged with a first portion of the external thread, and a second connection interface mounted on the spindle and engaged with a second portion of the external thread. The second connection interface is engaged with the external thread in such a way as to be moveable along the spindle axis relative to the first connection interface when the spindle is driven by the drive motor. Each of the first connection interface and the second connection interface include a connection feature that enables a mechanical connection with an external structure, and the first connection interface is disposed on the spindle at a location between the second connection interface and the transmission element.

The actuator may include one or more of the following features: The first connection interface includes a first interface housing that surrounds a portion of the spindle, and a lock nut disposed in the first interface housing, the lock nut having an internal thread that is engaged with, and fixed to, the external thread. The first connection interface includes a first thrust bearing mounted on the spindle, the thrust bearing disposed in the first interface housing between the lock nut and the first end. The actuator includes a drive motor having a drive shaft rotated by the drive motor, and a gear unit that transmits the output of the drive motor to the spindle. The gear unit includes a gear housing that surrounds a portion of the drive shaft, a drive gear disposed in the gear housing that engages the gear teeth of the transmission element, and a second thrust bearing disposed in the gear housing between the transmission element and an inner surface of the gear housing. The first connection interface includes a first interface housing that surrounds a first portion of the spindle. The first interface housing includes a sidewall that is radially spaced from, and encircles, the spindle; an end plate that closes a sidewall first end, the spindle passing through an opening in the end plate; and a stop that is joined to a sidewall second end. The spindle passes through an opening in the stop. The first connection interface includes a lock nut disposed in the first interface housing, the lock nut having an internal thread that is engaged with the external thread; and a thrust bearing that surrounds that spindle and is disposed in the first interface housing between the lock nut and the end plate. The first connection interface includes an elastic element disposed between the lock nut and the thrust bearing. The first interface housing includes an opening that is aligned with an axis transverse to the spindle axis and is configured to enable a mechanical connection with an external structure. The second connection interface includes a second interface housing that surrounds a second portion of the spindle. The second interface housing includes a blind opening that is aligned with an axis transverse to the spindle axis and is configured to enable a mechanical connection with an external structure.

The actuator may also include one or more of the following additional features: The first connection interface includes a first interface housing that surrounds a first portion of the spindle. The first interface housing includes a sidewall and an endplate. The sidewall is radially spaced from, and encircles, the spindle, and includes an open sidewall first end and an opposed sidewall second end. The end plate closes the sidewall second end, and the spindle passes through both the open sidewall first end and an opening in the endplate. The first connection interface includes a lock nut disposed on the spindle, the lock nut having an internal thread that is engaged with the external thread; and a thrust bearing that surrounds that spindle and is disposed between the lock nut and an outward-facing surface of the end plate. The first connection interface includes an elastic element disposed between the thrust bearing and the outward-facing surface of the end plate. The first interface housing includes an opening that is aligned with an axis transverse to the spindle axis and is configured to enable a mechanical connection with an external structure. The first portion of the external thread is disposed adjacent to the first end and the second portion of the external thread is disposed adjacent to the second end, and the first portion has a thread direction that is opposed to the thread direction of the second portion. The spindle is metal and the transmission element is an over-molded plastic gear element that is fixed to the spindle so as to rotate with the spindle about the spindle axis. The first connection interface is mounted on the spindle and engaged with a first portion of the external thread so as to be movable along the spindle axis. The first connection interface is mounted on the spindle and engaged with a first portion of the external thread so as to be fixed relative to the spindle axis. Each of the first connection interface and the second connection interface are moveable along the spindle axis upon rotation of the spindle, and are configured to move in opposed directions for a given direction of rotation of the spindle. The actuator includes a drive motor including a drive shaft rotated by the drive motor and a gear unit. The gear unit includes a gear housing that surrounds a portion of the drive shaft and a drive gear driven by the drive shaft. The gear teeth of the transmission element engage with teeth of the drive gear whereby the spindle can be driven to rotate about the spindle axis by the drive motor. The transmission element is a spline integrally formed on the first end of the spindle. The transmission element is a gear element that is overmolded on an outer surface of the first end of the spindle. The gear element includes the gear teeth and support surfaces provided on opposed sides of the gear teeth.

In some aspects, an actuator includes a spindle having an external thread and a transmission element disposed on a first end thereof. The transmission element is part of a worm drive mechanism and has radially extending gear teeth that are configured to engage a drive gear of a DC drive motor. The drive gear drives the spindle via the transmission element to rotate about a spindle axis. The actuator includes a first connection interface mounted on the spindle and engaged with the external thread, and a second connection interface mounted on the spindle and engaged with the external thread in such a way as to be moveable along the spindle axis relative to the first connection interface when the spindle is driven by the DC drive motor. Each of the first and second connection interfaces include connection features that enable a mechanical connection with an external structure, for example the telescoping sleeves of a vehicle steering column. In addition, the first connection interface is disposed on the spindle at a location between the second connection interface and the transmission element.

This can be compared to some conventional actuators used to adjust the position of a vehicle steering column. In such conventional actuators, the first connection interface and the second connection interface are disposed on the spindle on opposed sides of the transmission element which is disposed within a plastic gear housing of the drive motor. In such conventional actuators, loads may be transmitted from the second interface to the first interface via the spindle and the gear housing. In some cases, failures of the gear housing have occured, for example at an interface between the gear housing and the first connection interface. Since the actuator disclosed herein is arranged so that the first connection interface is disposed on the spindle at a location between the second connection interface and the transmission element, loads generated at the connection interfaces are not transmitted through the plastic gear housing, and actuator durability is improved. In particular, reaction forces due to loads at the connection interfaces are carried mainly by the spindle and not by the gear housing, increasing the tensile and compression resistance specification of the actuator according to spindle and transmission element mechanical resistance.

In some aspects, the actuator further includes a first thrust bearing mounted on the spindle and disposed inside the first connection interface, and a second thrust bearing mounted on the spindle and disposed in the gear housing. Since both the first and second thrust bearings are disposed within a housing, the thrust bearings are protected from particles and other contaminants, whereby actuator durability is further improved.

DETAILED DESCRIPTION

Referring to FIGS. 1-4, an actuator 10 includes a DC drive motor 12 and a spindle 30 that is connected to the drive motor 12 via a worm gear set 18. The drive motor 12 has a drive shaft 14 that terminates in a worm screw 16. The worm screw 16 is part of the worm gear set 18, and is enclosed in a gear housing 20 disposed at one end of the drive motor 12. The drive motor 12 drives the spindle 30 to rotate about a spindle axis 33 via the worm gear set 18. The actuator 10 further includes a pair of connection interfaces 60, 80 that are supported on the spindle 30 between opposed ends 31, 32 of the spindle 30 so as to be disposed on the same side of the gear housing 20, and are linarly movable relative to each other along the spindle axis 33, as discussed further below.

The spindle 30 is a rigid, high-strength, single-piece element that has a first end 31 that is disposed inside the gear housing 20, and an opposed, second end 32 that is disposed outside of the gear housing 20. In the illustrated embodiment, the spindle 30 is formed of metal, and the spindle first end 31 includes an over-molded plastic transmission element 37.

At the spindle first end 31, an outer surface of the spindle 30 is generally smooth and includes surface features 35, for example radial protrustions, that fix the over-molded transmission element 37 to the spindle first end 31. Between the first and second ends 31, 32, the outer surface of the spindle 30 includes a single continuous helical external, thread 36 which is engaged by each of the connection interfaces 60 80, as discussed further below.

The transmission element 37 encloses the circumference of the spindle first end 31, and has radially extending gear teeth 38 that function as a worm wheel as part of the gear set 18. In particular, the transmission element gear teeth 38 are configured to engage the drive shaft worm screw 16 so that in use, the worm screw 16 drives the spindle 30 to rotate about the spindle axis 33. The transmission element 37 includes a cylindrical first support surface 40 disposed on one side of the transmission element gear teeth 38, and a cylindrical second support surface 41 disposed on an opposed side of the transmission element gear teeth 38. The spindle first end 31, along with the first support surface 40, is rotatably supported within a recess 22 formed in the inside surface of the gear housing 20. The gear housing 20 includes an opening 24 at a location opposed to the recess 22, and the spindle 30, along with the second support surface 41, protrudes through the gear housing opening 24. The second support surface 41 is rotatably supported by the opening 24.

A first thrust bearing 50 is disposed in the gear housing 20 and surrounds the second support surface 41. More specifically, the first thrust bearing 50 is axially disposed between the transmission element gear teeth 38 and an inner surface of the gear housing 20.

The first connection interface 60 of the pair of connection interfaces 60, 80 is disposed on the spindle 30 adjacent to the gear housing 20. The first connection interface 60 includes a hollow, cylindrical first connection interface housing 61. The first connection interface housing 61 has a cylindrical sidewall 64 that is radially spaced apart from the spindle 30, and an integral end plate 62 that closes a proximal end of the sidewall 64. As used herein, the term proximal end refers to an end that is closer to the spindle first end 31 than an opposed, or distal end. The end plate 62 is fixed to the gear housing 20, and has a central opening 63 through which a the spindle 30 and the second support surface 41 protrude. The second support surface 41 is axially dimensioned so as to terminate just inside the first connection interface housing 61, and a second thrust bearing 52 that is disposed inside the first connection interface housing 61 surrounds the second support surface 41. In addition, a lock nut 68 is supported on the spindle 30 inside the first connection interface, housing 61, and an elastic member 74 such as a spring washer is disposed on the spindle 30 between the lock nut 68 and the second thrust bearing 52. Each of the second thrust bearing 52, the elastic member 74 and the lock nut 68 are encircled by the sidewall 64. The elastic member 74, disposed at the proximal end of the lock nut 68, provides axial contact between the lock nut 68 and the second thrust bearing 52 regardless of wear conditions within the first connection interface housing 61 over time.

The lock nut 68 includes an internal thread that engages with the spindle external thread 36 in such a way that the lock nut 68 rotates with the spindle 30. For example, in some embodiments, the lock nut 68 is fixed to the spindle 30 via a press fit or by using an adhesive. The lock nut 68 has a relatively long axial dimension to faciliate transfer of external load from the first connection interface 60 to the spindle 30, for example by transmitting the load over a relatively large area. In addition, an outer surface of the lock nut 68 is tapered such that the lock nut has a maximum radius adjacent to the elastic member 74, and a minimum radius adjacent an open end of the sidewall 64. The taper provides a radial spacing between the lock nut outer surface and the sidewall 64 that is used to facilitate tool access to the lock nut 68. In addition, axially-extending grooves 71 are formed in the lock nut outer surface that are used to receive tools used to install the lock nut 68.

The first connection interface housing 61 includes a stop plate 72 that abuts the distal end of the sidewall 64 and closes an open end of the first connection interface housing 61. In the illustrated embodiment the stop plate 72 includes a reduced diameter portion 75 that is press-fit within the sidewall 64. The stop plate 72 includes a central opening 73, and the spindle 30 extends through the stop plate central opening 73.

The first connection interface housing 61 further includes a pair of first connection openings 67 that extend radially through the sidewall 64. The first connection openings 67 are disposed on opposed sides of the first connection interface housing 61, whereby only one first connection opening 67 is visible in the figures. Each first connection opening 67 is configured to enable a mechanical connection to be formed between the first connection interface 60 and an external structure, such as a first telescoping sleeve of a steering column. For example, in the illustrated embodiment, the first connection openings 67 have a circular peripheral shape, and are configured to receive a first pin or first pair of pins (not shown).

The second connection interface 80 of the pair of connection interfaces 60, 80 is disposed on the spindle 30 outboard of the first connection interface 60 so as to be disposed between to the spindle second end 32 and the first connection interface 60. The second connection interface 80 consists of a second connection interface housing 81 that is a solid (e.g., non-hollow), single component element. The second connection interface housing 81 has an axial through passage 82 configured to receive the spindle 30 therethrough. In particular, the through passage 82 extends between a first (i.e., proximal) end 83 and a second (i.e., distal end) 84 of the second connection interface housing 81, and includes an interior thread that engages with the spindle external thread 36 in such a way as to be moveable along the spindle axis 33 relative to the first connection interface 60 when the spindle 30 is driven by the drive motor 12.

The second connection interface 80 includes a pair of second connection openings 87 that extend radially within the second connection interface housing 81. The second connection openings 87 are disposed on opposed sides of the second connection interface housing 81, whereby only one second connection opening 87 is visible in the figures. Each second connection opening 87 is a blind hole that is configured to enable a mechanical connection to be formed between the second connection interface 80 and an external structure, such as second telescoping sleeve of a steering column. For example, in the illustrated embodiment, each second connection opening 87 has a circular peripheral shape, and is configured to receive a second pin or a second pair of pins (not shown).

The actuator 10 further includes a stop ring 90 that serves to retain the second connection interface 80 on the spindle 30 and to limit the extent of travel of the second connection interface 80 along the spindle axis 33 in a direction away from the gear housing 20. The stop ring 90 is an annular element. In addition, a stop clip 92, positioned on a distal side of the stop ring 90, is disposed in a circumferential groove 44 located at the spindle second end 32. The stop clip 92 retains the stop ring 90 on the spindle second end 32.

In use, when the drive motor 12 is operating in a forward direction, the spindle 30 is driven to rotate in a first direction (for example a clockwise direction) about the spindle axis 33. As a result, the second connection interface 80 moves linearly in a proximal direction toward the first connection interface 60 due to engagement of the threads of the the second connection interface 80 and the spindle exterior thread 36. When the drive motor 12 is operating in a reverse direction, the spindle 30 is driven to rotate in a second direction (for example, a counter-clockwise direction) about the spindle axis 33. As a result, the second connection interface 80 moves linearly in a distal direction away from the first connection interface 60 to an extent permitted by the stop ring 90. In particular, the first connection interface 60 is fixed relative to the gear housing 20, and the second connection interface 80 moves toward or away from the first connection interface 60 along the spindle axis 33, depending on the rotation direction of the spindle 30. The extent to which the second connection interface 80 can travel is limited by the stop plate 72 of the first connection interface 60 in one direction, and the stop ring 90 in the opposed direction.

Figure 5:
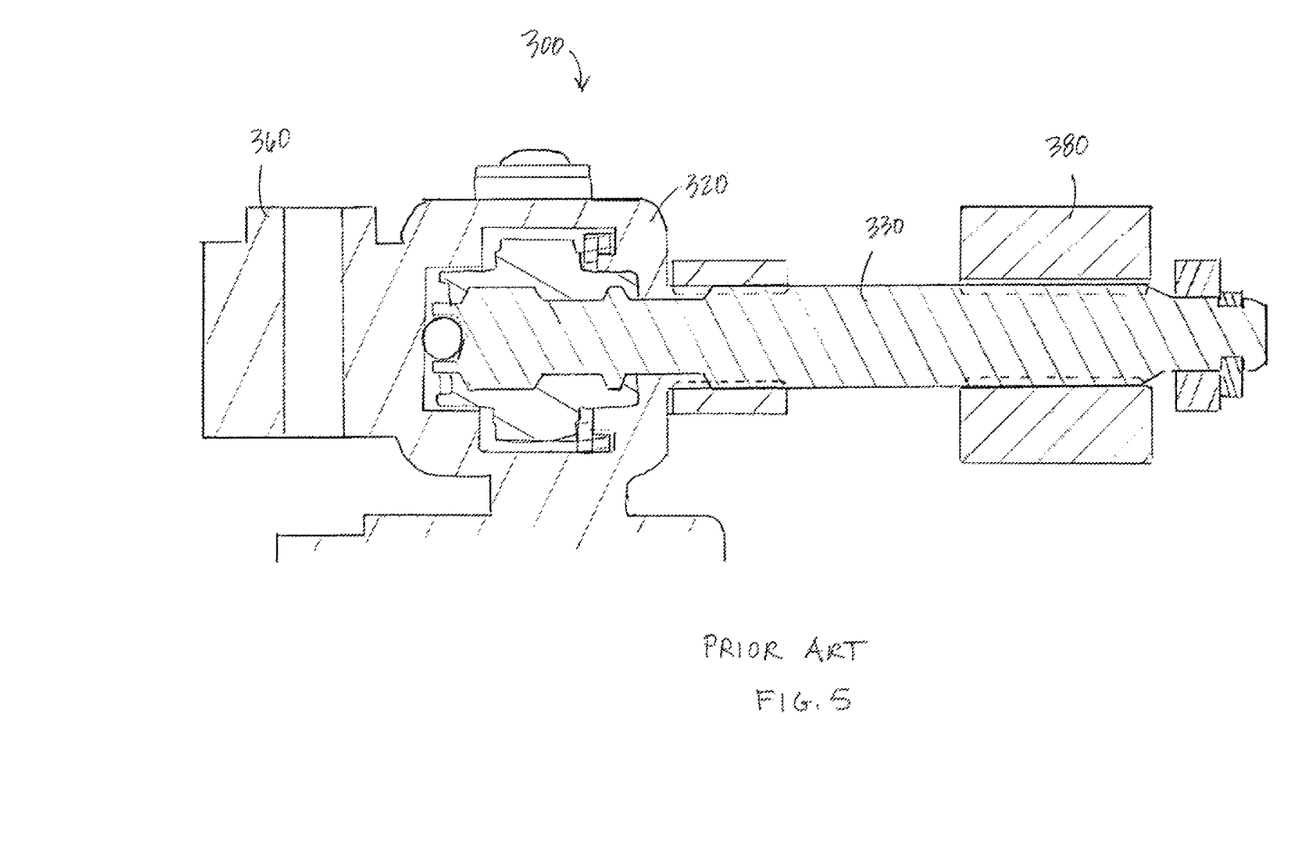
FIG. 5 is a cross-sectional view of an exemplary conventional actuator.

In the actuator 10, the first connection interface 60 is disposed on the spindle 30 at a location between the second connection interface 80 and the transmission element 37, which is disposed in the gear housing 20. As a result of this configuration, external loads experienced by the first connection interface 60 and the second connection interface 80 are transmitted to the spindle 30 and to the first and second connection interface housings 61, 81, rather than through the gear housing 20, whereby durability of the actuator 10 is increased relative to some conventional actuators 300 in which the first and second connection interfaces 360, 380 are disposed on opposed sides of the gear housing 320 (FIG. 5).

In some embodiments, since the external loads are transmitted through the actuator 10 via the spindle 30 and the lock nut 68, the spindle 30 and the lock nut 68 may be formed of a high strength material such as metal, whereas the gear housing 20, the first connection interface housing 61 and the second connection interface housing 81 may be made of a relatively lower strength material such as plastic.

In the actuator 10, the first thrust bearing 50 is disposed within the gear housing 20, and the second thrust bearing 52 is disposed within the first connection interface housing 61, whereby both the first and second thrust bearings 50, 52 are enclosed within a housing. As a result of this configuration, both the first and second thrust bearings 50, 52 are protected from contamination, whereby durability is increased relative to some conventional actuators in which at least one of the thrust bearings is positioned outside both the gear housing 20 and the first connection interface housing 61.

Figure 6:
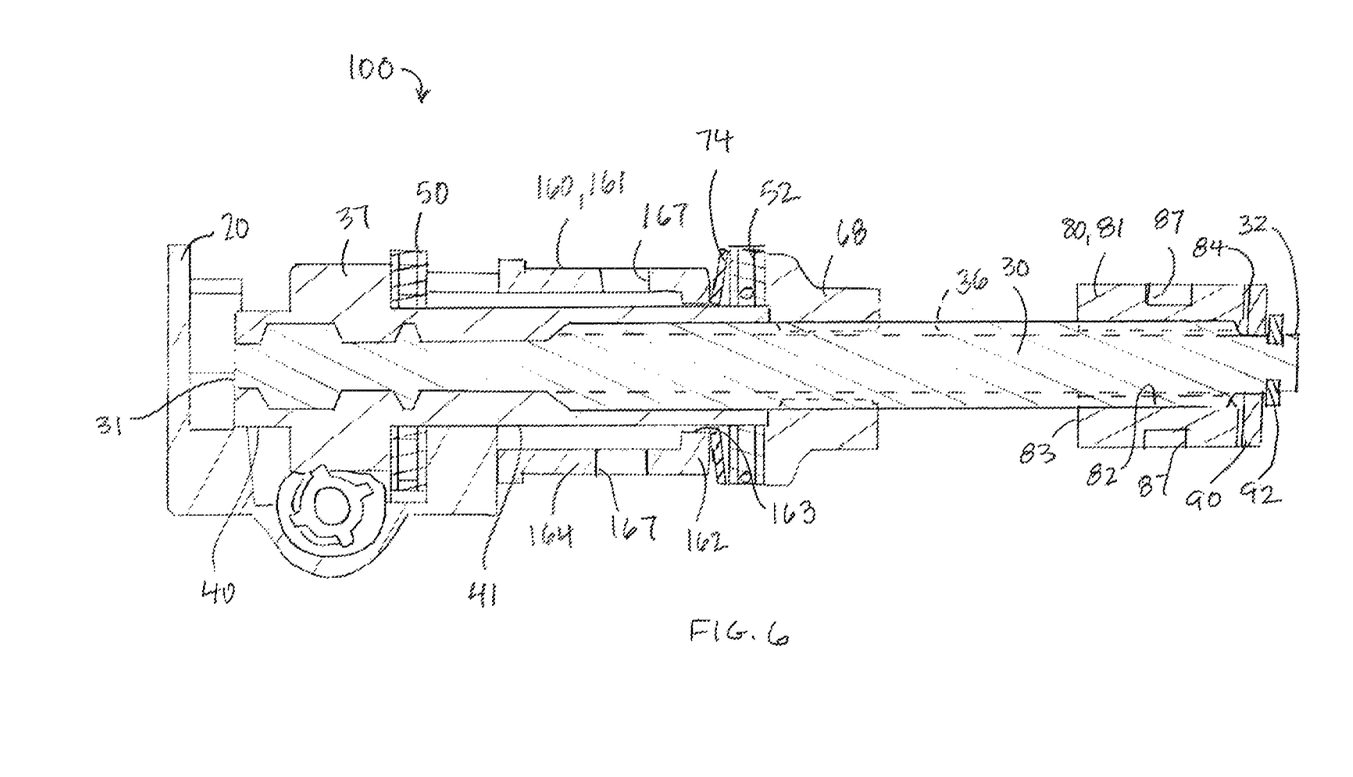
FIG. 6 is a cross sectional view of an alternative embodiment actuator.

Referring to FIG. 6, an alternative embodiment actuator 100 is similar to the actuator 10 described above with respect to FIGS. 1-4, and common elements will be referred to using common reference numbers. The alternative embodiment actuator 100 differs from the actuator 10 described above since it includes an alternative embodiment first connection interface 160. The alternative embodiment first connection interface 160 is disposed on the spindle 30 adjacent to the gear housing 20. The first connection interface 160 includes a hollow, cylindrical first connection interface housing 161. The first connection interface housing 61 has a cylindrical sidewall 164 that is radially spaced apart from the spindle 30, and an integral end plate 162 that closes a distal end of the sidewall 164. The end plate 162 has a central opening 163 through which a the spindle 30 and the second support surface 41 protrudes. The second support surface 41 is axially dimensioned so as to terminate just outside the distal end of the first connection interface housing 161, and the second thrust bearing 52 is disposed outside the first connection interface housing 161 and surrounds the second support surface 41. In addition, the lock nut 68 is supported on the spindle 30 outside the first connection interface housing 161, and the elastic member 74 is disposed on the spindle 30 between the second thrust bearing 52 and the end plate 162. The elastic member 74, disposed at the proximal end of the second thrust bearing 52, provides axial contact between the lock nut 68 and the second thrust bearing 52 regardless of wear conditions over time.

The first connection interface housing 161 further includes a pair of first connection openings 167 that extend radially through the sidewall 164. The first connection openings 167 are disposed on opposed sides of the first connection interface housing 161. Each first connection opening 167 is configured to enable a mechanical connection to be formed between the first connection interface 160 and an external structure, such as a first telescoping sleeve of a steering column. For example, in the illustrated embodiment, the first connection openings 167 have a circular peripheral shape, and are configured to receive a first pin or a first pair of pins (not shown).

Figure 1:
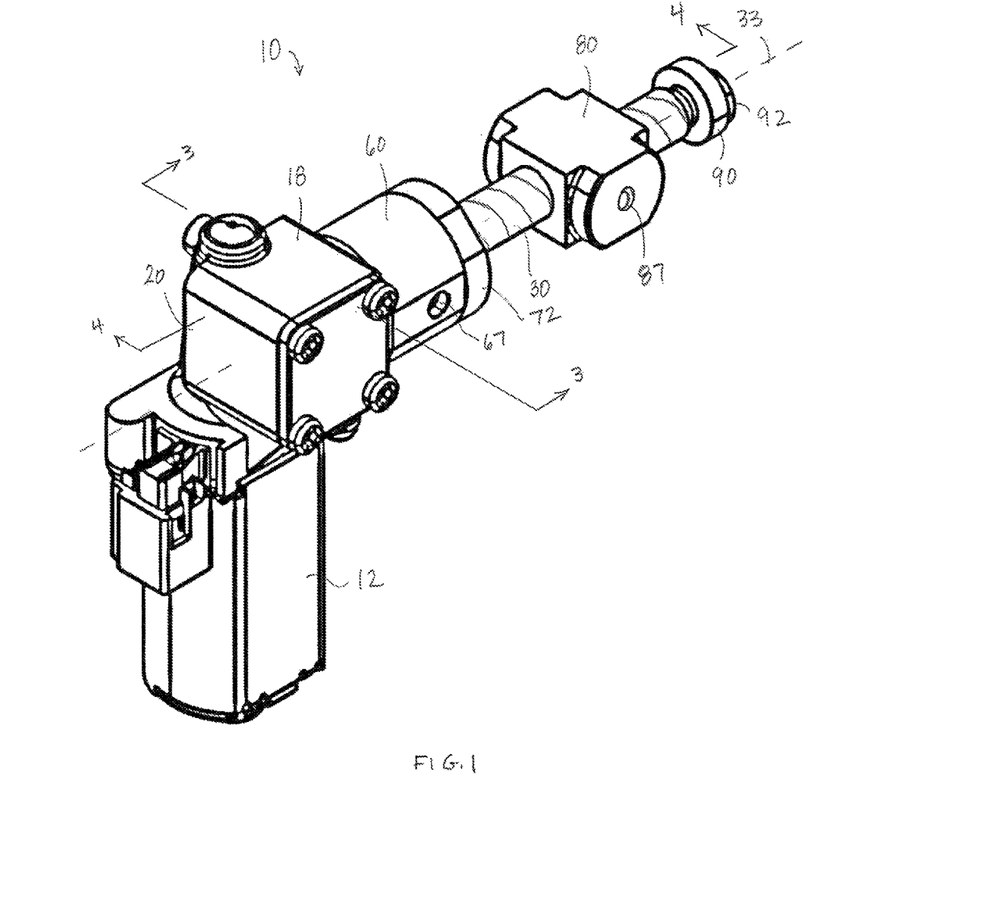
FIG. 1 is a perspective view of an actuator including a DC drive motor and a spindle connected to the DC drive motor via a speed reducing gear unit.
Figure 2:
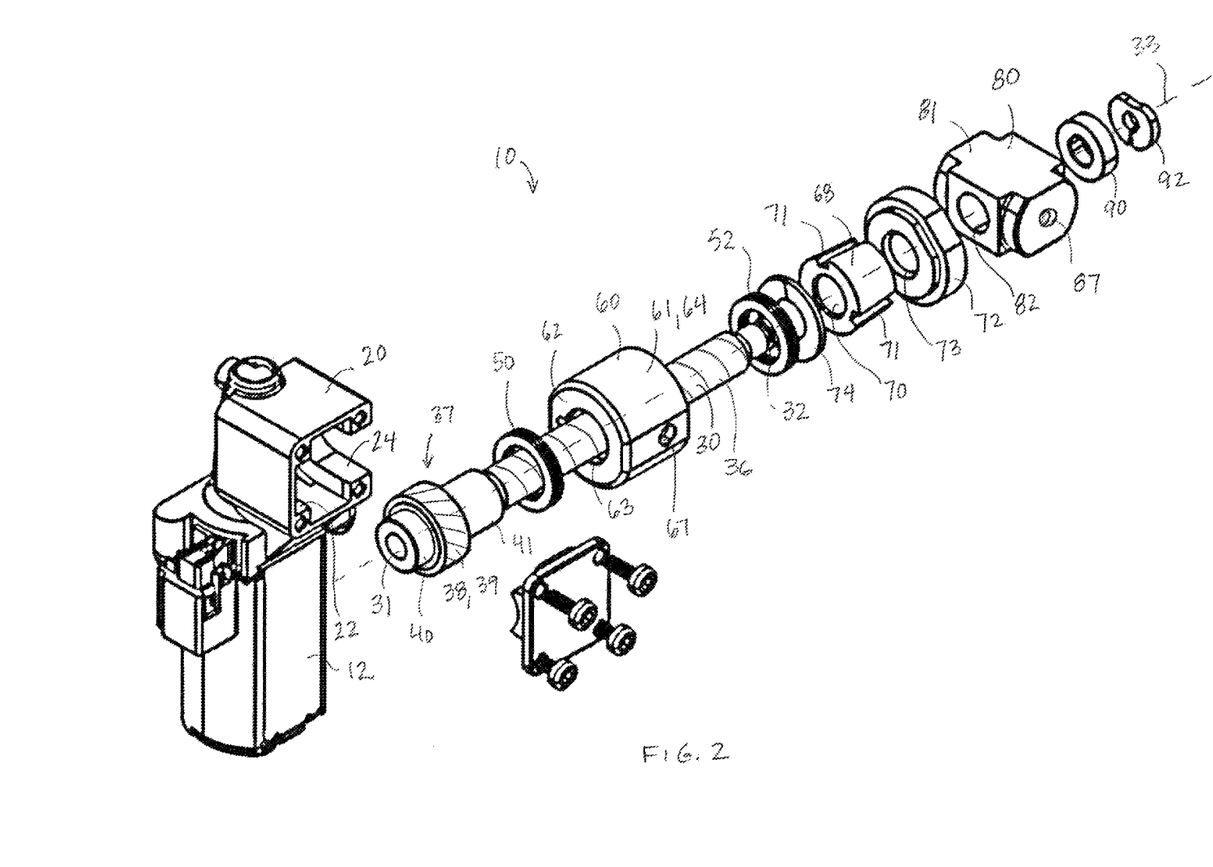
FIG. 2 is an exploded perspective view of the actuator of FIG. 1.
Figure 3:
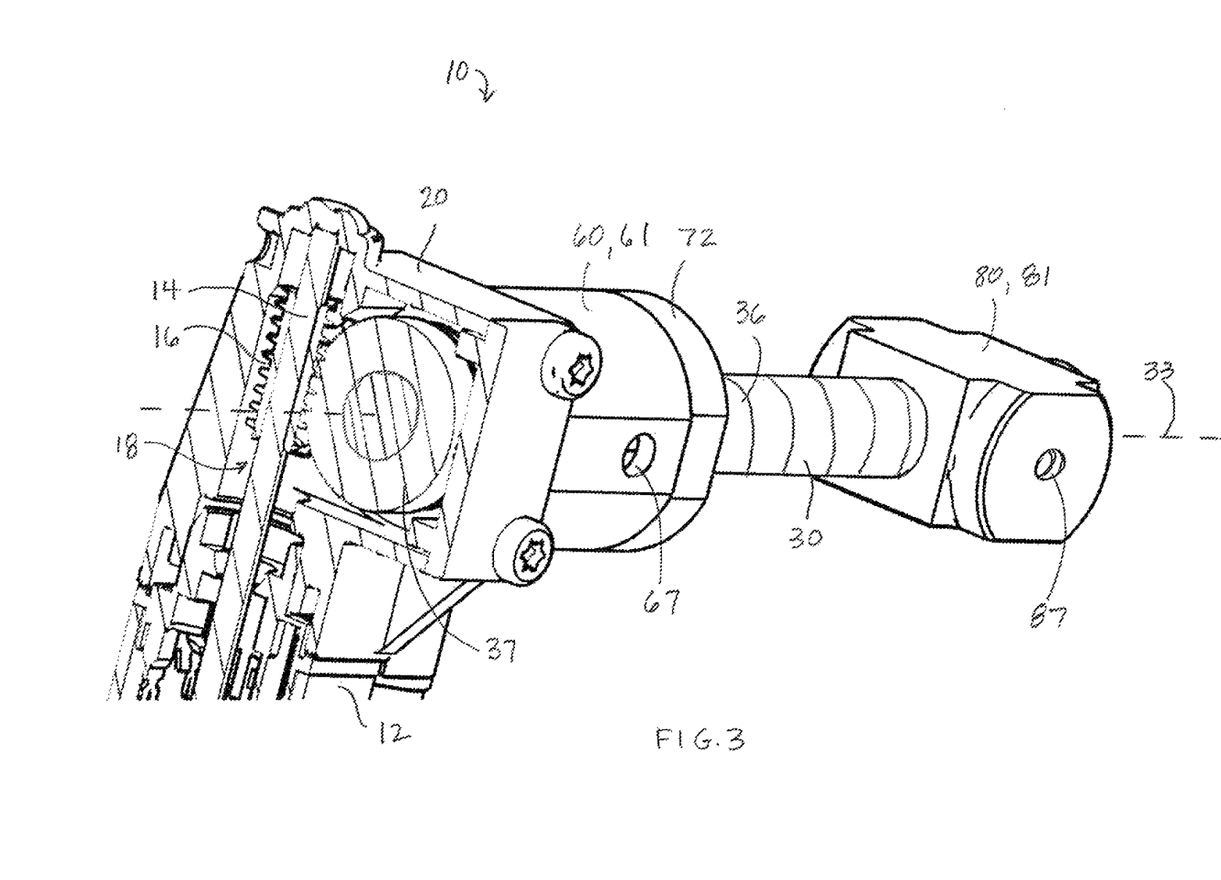
FIG. 3 is a cross sectional view of the actuator of FIG. 1 as seen along line 3-3 of FIG.
Figure 4:
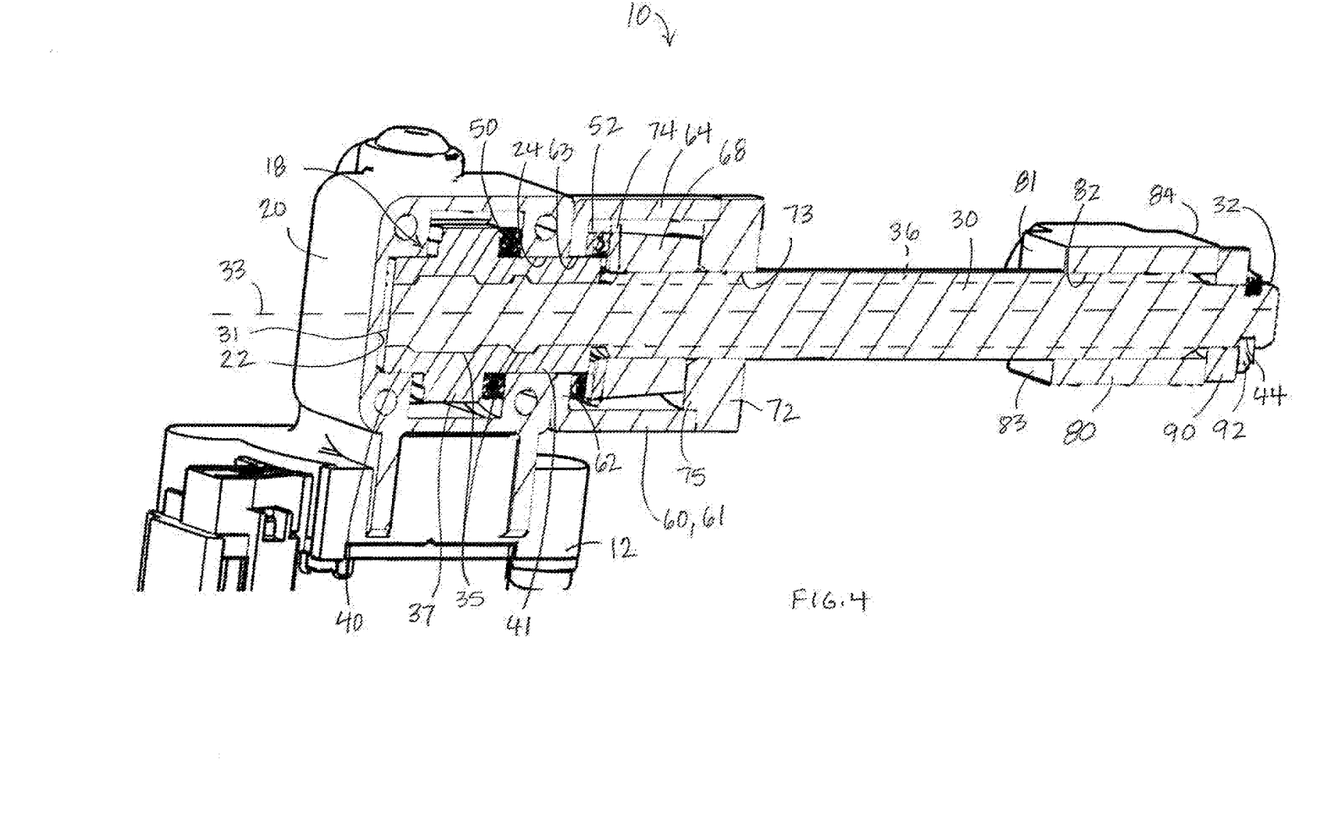
FIG. 4 is a cross sectional view of the actuator of FIG. 1 as seen along line 4-4 of FIG. 1.

By positioning the lock nut 68, the second thrust washer 52 and the elastic member 74 outside of the first connection interface housing 61, the radial dimension of the first connection interface housing 161 shown in FIG. 6 can be made smaller than the radial dimension of the previous embodiment first connection interface housing 61 shown in FIG. 4.

As a result, the actuator 100 including the alternative embodiment first connection interface 160 can be used in applications having restrictive space requirements.

Figure 7:
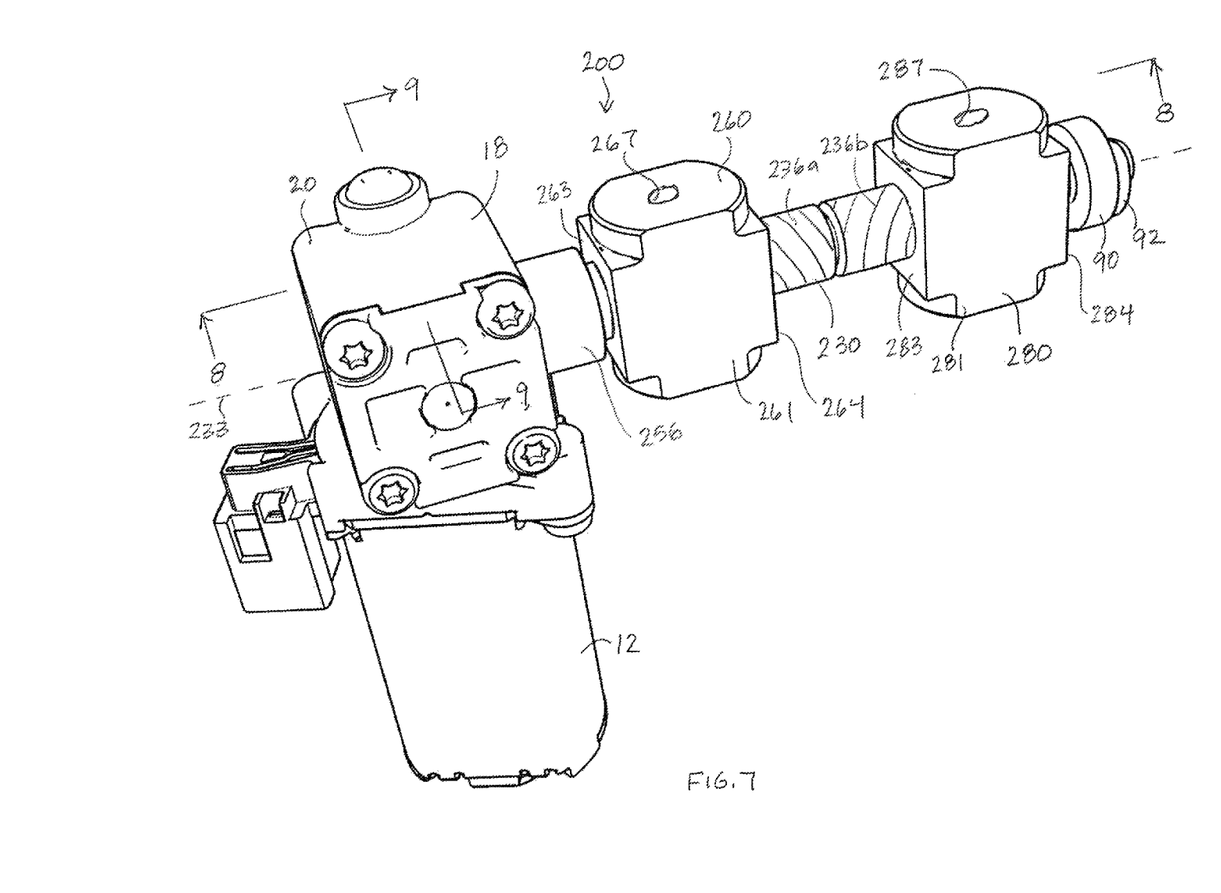
FIG. 7 is a perspective view of another alternative embodiment actuator.
Figure 8:
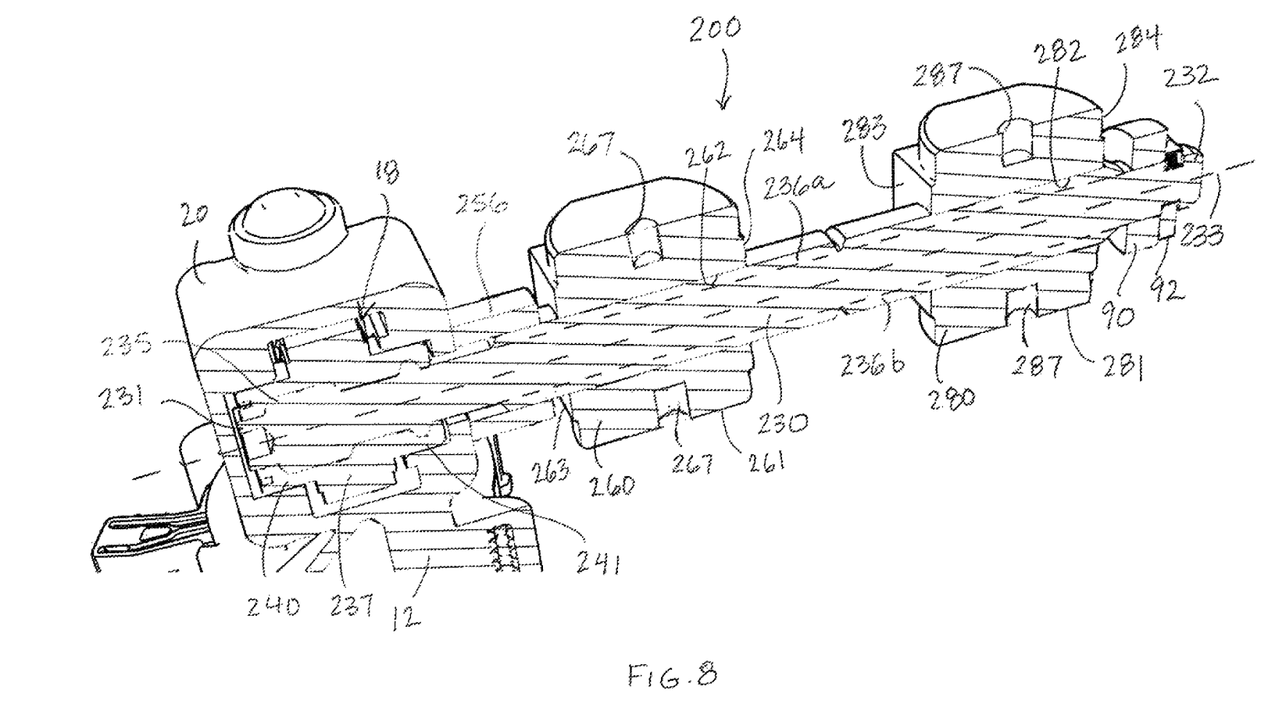
FIG. 8 is a cross sectional view of the actuator of FIG. 7 as seen along line 8-8 of FIG. 7.
Figure 9:
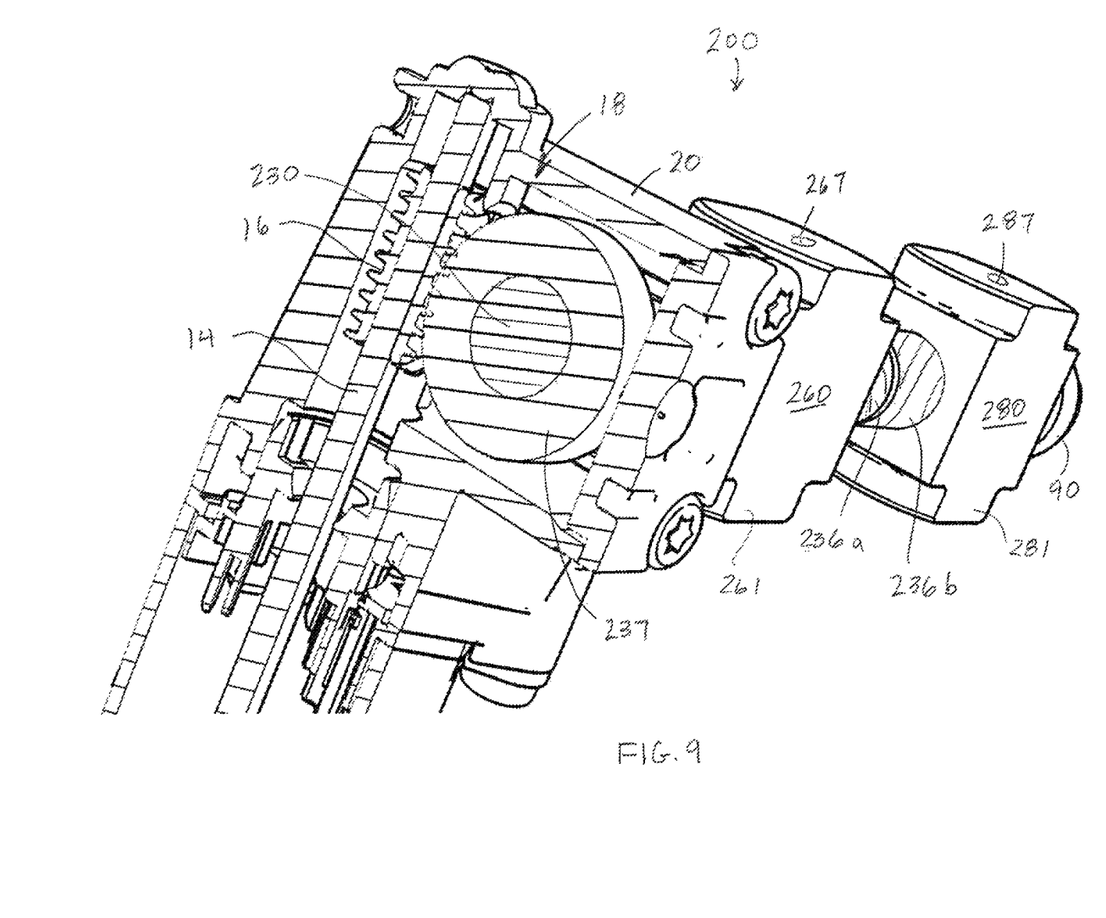
FIG. 9 is a cross sectional view of the actuator of FIG. 7 as seen along line 9-9 of FIG. 7.

Referring to FIGS. 7-9, an alternative embodiment actuator 200 has features in common with the actuator 10 described above with respect to FIGS. 1-4, and common elements will be referred to using common reference numbers. The actuator 200 includes the drive motor 12 and a spindle 230 that is connected to the drive motor 12 via the worm gear set 18. The drive motor 12 drives the spindle 230 to rotate about a spindle axis 233 via the worm gear set 18. The actuator 200 further includes a pair of connection interfaces 260, 280 that are supported on the spindle 230 between opposed ends 231, 232 of the spindle 230 so as to be disposed on the same side of the gear housing 20, and are linarly movable relative to each other along a spindle axis 233, as discussed further below.

The spindle 230 is a rigid, high-strength, single-piece element that has a first end 231 that is disposed inside the gear housing 20, and an opposed, second end 232 that is disposed outside of the gear housing 20. In the illustrated embodiment, the spindle 230 is formed of metal, and the spindle first end 231 includes an over-molded plastic transmission element 237.

At the spindle first end 231, an outer surface of the spindle 230 is generally smooth and includes surface features 235, for example radial protrustions, that fix the over-molded transmission element 237 to the spindle first end 231. Between the first and second ends 231, 232, the outer surface of the spindle 230 includes a mixed helical external thread 236 which is engaged by each of the connection interfaces 260, 280, as discussed further below. In particular, a first portion 236a of the external thread 236 has a first helical thread and is disposed adjacent the spindle first end 231. A second portion 236b of the external thread 236 has a second helical thread, and is disposed between the first portion 236a and the spindle second end 232. The first portion 236a has a thread direction that is opposed to the thread direction of the second portion 236b.

The transmission element 237 encloses the circumference of the spindle first end 231, and has radially extending gear teeth 238 that function as a worm wheel as part of the gear set 18. In particular, the transmission element gear teeth 238 are configured to engage the drive shaft worm screw 16 so that in use the worm screw 16 drives the spindle 230 to rotate about the spindle axis 233. The transmission element 237 includes a cylindrical first support surface 240 disposed on one side of the transmission element gear teeth 238, and a cylindrical second support surface 241 disposed on an opposed side of the transmission element gear teeth 238. The spindle first end 231, along with the first support surface 240, is rotatably supported within a recess 22 formed in the inside surface of the gear housing 20. The gear housing 20 includes an opening 24 at a location opposed to the recess 22, and a recess 24a centered on the opening 24. The second support surface 241 is rotatably supported in the recess 24a, and the spindle 230 protrudes through the gear housing opening 24.

The first connection interface 260 of the pair of connection interfaces 260, 280 is disposed on the spindle 230 adjacent to the gear housing 20. The first connection interface 260 includes a first connection interface housing 261. The first connection interface housing 261 is a non-hollow, single component element that has an axial through passage 262 configured to receive the spindle 230 therethrough. In particular, the through passage 262 extends between a first (i.e., proximal) end 263 and a second (i.e., distal end) 264 of the first connection interface housing 261, and includes an interior thread that engages with the first portion 236a of the spindle external thread 236 in such a way as to be moveable along the spindle axis 233 relative to the second connection interface 80 when the spindle 230 is driven by the drive motor 12.

The first connection interface housing 261 further includes a pair of first connection openings 267 that extend radially, transverse to the spindle axis 233. The first connection openings 267 are disposed on opposed sides of the first connection interface housing 261. Each first connection opening 267 is a blind hole that is configured to enable a mechanical connection to be formed between the first connection interface 260 and an external structure, such as a first telescoping sleeve of a steering column. For example, in the illustrated embodiment, the first connection openings 267 have a circular peripheral shape, and are configured to receive a first pin or a first pair of pins (not shown).

The second connection interface 280 of the pair of connection interfaces 260, 280 is disposed on the spindle 230 outboard of the first connection interface 260 so as to be so as to be disposed between the spindle second end 232 and the first connection interface 260. The second connection interface 280 includes a second connection interface housing 281. The second connection interface housing 281 is a solid non-hollow), single component element and has an axial through passage 282 configured to receive the spindle 230 therethrough. In particular, the through passage 282 extends between a first (i.e., proximal) end 283 and a second (i.e., distal end) 284 of the second connection interface housing 281, and includes an interior thread that engages with the second portion 236b of the spindle external thread 236 in such a way as to be moveable along the spindle axis 233 relative to the first connection interface 260 when the spindle 230 is driven by the drive motor 12.

The second connection interface housing 281 includes a pair of second connection openings 287 that extend radially, e.g., transverse to the spindle axis 233. The second connection openings 287 are disposed on opposed sides of the second connection interface housing 281. Each of the second connection openings 287 is a blind hole that is configured to enable a mechanical connection to be formed between the second connection interface 280 and an external structure, such as second telescoping sleeve of a steering column. For example, in the illustrated embodiment, the second connection opening 287 has a circular peripheral shape, and is configured to receive a second pin or a second pair of pins (not shown).

The actuator 200 further includes the stop ring 90 that serves to retain the second connection interface 280 on the spindle 230 and to limit the extent of travel of the second connection interface 280 along the spindle axis 233 in a direction away from the gear housing 20. The stop ring 90 is an annular element, in addition, the stop clip 92 retains the stop ring 90 on the spindle second end 232.

In use, when the drive motor 12 is operating in a forward direction, the spindle 230 is driven to rotate in a first direction (for example a clockwise direction) about the spindle axis 233. As a result, the first connection interface 260 and the second connection interface 280 move linearly toward each other due to engagement of the internal threads of the first connection interface 260 and the first portion 236a of the spindle exterior thread 236, and of the internal threads of the second connection interface 280 and the second portion 236b of the spindle exterior thread 236, since the thread direction of the first portion 236a is opposed to the thread direction of the second portion 236b. When the drive motor 12 is operating in a reverse direction, and the spindle 230 is driven to rotate in a second direction (for example, a counter-clockwise direction) about the spindle axis 233. As a result, the first connection interface 260 and the second connection interface 280 move linearly away from each other to an extent permitted by the stop ring 90 and an inner stop 256. In particular, both the first connection interface 260 and the second connection interface 280 are moveable along the spindle axis 233, and move in opposed directions. The extent of linear motion along the spindle axis 233 can be controlled by changing the overall length of the first and second thread portions 236a, 236b in combination with the overall length of one or both of the inner stop 256 and the stop ring 90.

Although the spindle 30, 230 is described herein as being a single-piece element, it is not limited to being a single-piece element. For example, in some embodiments, the spindle 30, 230 is manufactured in multiple pieces that are then joined to form a single, integrated unit. Moreover, the spindle 30, 230 is not limited to being formed by any one process or of any one material. The number of elements used to form the spindle 30, 230, and the materials and processes used to form the spindle 30, 230, are determined by the requirements of the specific application.

Although the actuator 10 is described herein as including the DC drive motor 12, it is not limited to employing this type of motor. Other appropriate types of motors can be used, and the specific motor used is determined by the requirements of the specific application.

Although the actuator is described herein as having application to steering column adjustment, it is not limited to this application. Alternative applications, include, but are not limited to other vehicle applications that require relative linear motion such as seat positioning. Moreover, the actuator may be used for non-vehicle applications that require relative linear motion such as may occur in manufacturing, robotics, etc.

Selective illustrative embodiments of the system and device are described above in some detail. It should be understood that only structures considered necessary for clarifying the system and device have been described herein. Other conventional structures, and those of ancillary and auxiliary components of the system and device, are assumed to be known and understood by those skilled in the art. Moreover, while a working example of the system and device have been described above, the system and device are not limited to the working examples described above, but various design alterations may be carried out without departing from the system and device.

What is claimed is:

1. An actuator comprising a spindle having a first end and an opposed second end, the spindle including an external thread disposed between the first end and the second en&
   a transmission element disposed on the first end and having radially extending gear teeth, the gear teeth configured to engage a drive gear that drives the spindle to rotate about a spindle axis,
   a first connection interface mounted on the spindle and engaged with a first portion of the external thread; and
   a second connection interface mounted on the spindle and engaged with a second portion of the external thread, wherein
   the second connection interface is engaged with the external thread in such a way as to be moveable along the spindle axis relative to the first connection interface when the spindle is driven by the drive motor, each of the first connection interface and the second connection interface include a connection feature that enables a mechanical connection with an external structure, and the first connection interface is disposed on the spindle at a location between the second connection interface and the transmission element.

2. The actuator of claim 1, wherein the first connection interface includes
a first interface housing that surrounds a portion of the spindle, and
a lock nut disposed in the first interface housing, the lock, nut having an internal thread that is engaged with, and fixed to, the external thread.

3. The actuator of claim 1, wherein the first connection interface includes
a first interface housing that surrounds a portion of the spindle,
a lock nut disposed in the first interface housing, the lock nut having an internal thread that is engaged with the external thread, and
a first thrust bearing mounted on the spindle, the thrust bearing disposed in the first interface housing between the lock nut and the first end.

4. The actuator of claim 3, comprising
a drive motor including a drive shaft rotated by the drive motor; and
a gear unit that transmits the output of the drive motor to the spindle, the gear unit including
a gear housing that surrounds a portion of the drive shaft,
a drive gear disposed in the gear housing that engages the gear teeth of the transmission element, and
a second thrust bearing disposed in the gear housing between the transmission element and an inner surface of the gear housing.

5. The actuator of claim 1, wherein the first connection interface includes
a first interface housing that surrounds a first portion of the spindle, the first interface housing including
a sidewall that is radially spaced from, and encircles, the spindle,
an end plate that closes a sidewall first end, the spindle passing through an opening in the end plate, and
a stop that is joined to a sidewall second end, the spindle passing through an opening in the stop;
a lock nut disposed in the first interface housing, the lock nut having an internal thread that is engaged with the external thread; and
a thrust bearing that surrounds that spindle and is disposed in the first interface housing between the lock nut and the end plate.

6. The actuator of claim 5, wherein the first connection interface includes an elastic element disposed between the lock nut and the thrust bearing.

7. The actuator of claim 5, wherein the first interface housing includes an opening that is aligned with an axis transverse to the spindle axis and is configured to enable a mechanical connection with an external structure.

8. The actuator of claim 1, wherein the second connection interface includes
a second interface housing that surrounds a second portion of the spindle, the second interface housing including a blind opening that is aligned with an axis transverse to the spindle axis and is configured to enable a mechanical connection with an external structure.

9. The actuator of claim 1, wherein the first connection interface includes
a first interface housing that surrounds a first portion of the spindle, the first interface housing including
a sidewall that is radially spaced from, and encircles, the spindle, the sidewall including an open sidewall first end and an opposed sidewall second end, and
an end plate that closes the sidewall second end, the spindle passing through both the open sidewall first end and an opening in the end plate,
a lock nut disposed on the spindle, the lock nut having an internal thread that is engaged with the external thread;
a thrust bearing that surrounds that spindle and is disposed between the lock nut and an outward-facing surface of the end plate.

10. The actuator of claim 9, wherein the first connection interface includes an elastic element disposed between the thrust bearing and the outward-facing surface of the end plate.

11. The actuator of claim 9, wherein the first interface housing includes an opening that is aligned with an axis transverse to the spindle axis and is configured to enable a mechanical connection with an external structure.

12. The actuator of claim 1, wherein the first portion of the external thread is disposed adjacent to the first end and the second portion of the external thread is disposed adjacent to the second end, and the first portion has a thread direction that is opposed to the thread direction of the second portion.

13. The actuator of claim 1, wherein the spindle is metal and the transmission element is an over-molded plastic gear element that is fixed to the spindle so as to rotate with the spindle about the spindle axis.

14. The actuator of claim 1, wherein the first connection interface is mounted on the spindle and engaged with a first portion of the external thread so as to be movable along the spindle axis.

15. The actuator of claim 1, wherein the first connection interface is mounted on the spindle and engaged with a first portion of the external thread so as to be fixed relative to the spindle axis.

16. The actuator of claim 1, wherein each of the first connection interface and the second connection interface are moveable along the spindle axis upon rotation of the spindle, and are configured to move in opposed directions for a given direction of rotation of the spindle.

17. The actuator of claim 1, comprising
a drive motor including a drive shaft rotated by the drive motor; and
a gear unit including a gear housing that surrounds a portion of the drive shaft and a drive gear driven by the chive shaft,
wherein the gear teeth of the transmission element engage with teeth of the drive gear whereby the spindle can be driven to rotate about the spindle axis by the drive motor.

18. The actuator of claim 1, wherein the transmission element is a spline integrally formed on the first end of the spindle.

19. The actuator of claim 1, wherein the transmission element is a gear element that is overmolded on an outer surface of the first end of the spindle, the gear element including the gear teeth and support surfaces provided on opposed sides of the gear teeth.

* * * * *

UNITED STATES PATENT AND TRADEMARK OFFICE
CERTIFICATE OF CORRECTION

PATENT NO. : 10,228,047 B2
APPLICATION NO. : 15/185348
DATED : March 12, 2019
INVENTOR(S) : Nunez et al.

Page 1 of 1

It is certified that error appears in the above-identified patent and that said Letters Patent is hereby corrected as shown below:

In the Claims

In Column 10, Lines 52-54, Lines 1-3 of Claim 1 should read:
1. An actuator comprising a spindle having a first end and
an opposed second end, the spindle including an external
thread disposed between the first end and the second end In Column 11, Lines 12-14, Lines 5-7 of Claim 2 should read:
a lock nut disposed in the first interface housing, the lock
    nut having an internal thread that is engaged with, and
    fixed to, the external thread.

In Column 12, Lines 51-53, Lines 4-6 of Claim 17 should read:
a gear unit including a gear housing that surrounds a
    portion of the drive shaft and a drive gear driven by the
    drive shaft, Signed and Sealed this
Eleventh Day of June, 2019

Andrei Iancu
*Director of the United States Patent and Trademark Office*